US011673432B2

(12) United States Patent
Kakihara et al.

(10) Patent No.: US 11,673,432 B2
(45) Date of Patent: Jun. 13, 2023

(54) VEHICLE

(71) Applicant: SUBARU CORPORATION, Tokyo (JP)

(72) Inventors: Yusuke Kakihara, Tokyo (JP); Yusuke Yabusaki, Tokyo (JP); Hiroomi Kobayashi, Tokyo (JP); Hiromasa Kitamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 139 days.

(21) Appl. No.: 17/205,526

(22) Filed: Mar. 18, 2021

(65) Prior Publication Data

US 2021/0309056 A1 Oct. 7, 2021

(30) Foreign Application Priority Data

Apr. 2, 2020 (JP) .............................. JP2020-066613

(51) Int. Cl.
| | |
|---|---|
| *B60W 10/14* | (2012.01) |
| *B60C 23/00* | (2006.01) |
| *B60W 10/30* | (2006.01) |
| *B60W 40/13* | (2012.01) |
| *B60W 40/076* | (2012.01) |

(52) U.S. Cl.
CPC ........... *B60C 23/002* (2013.01); *B60W 10/14* (2013.01); *B60W 10/30* (2013.01); *B60W 40/076* (2013.01); *B60W 2040/1307* (2013.01)

(58) Field of Classification Search
CPC ...... B60C 23/002; B60W 10/14; B60W 10/30
See application file for complete search history.

(56) References Cited

U.S. PATENT DOCUMENTS

| | | | | |
|---|---|---|---|---|
| 6,499,552 B2 * | 12/2002 | Bell | ...................... | B60C 23/002 |
| | | | | 180/24.09 |
| 7,356,401 B2 * | 4/2008 | Romer | .................. | B60K 28/16 |
| | | | | 701/87 |
| 2016/0167462 A1 | 6/2016 | Juzswik | | |

FOREIGN PATENT DOCUMENTS

JP 2018-500233 A 1/2018

\* cited by examiner

*Primary Examiner* — Derek D Knight
(74) *Attorney, Agent, or Firm* — McGinn I.P. Law Group, PLLC.

(57) ABSTRACT

A vehicle includes a center differential device and an air pressure controller. The center differential device includes a first output shaft coupled to front wheels and a second output shaft coupled to rear wheels. The center differential device is configured to perform differential operation between the first output shaft and the second output shaft and to limit the differential operation between the first output shaft and the second output shaft. The air pressure controller is configured to control air pressure of one or more tires of the front wheels and the rear wheels such that an average rotational speed of the front wheels and an average rotational speed of the rear wheels are equal to each other.

11 Claims, 5 Drawing Sheets

VEHICLE

CROSS-REFERENCE TO RELATED APPLICATIONS

The present application claims priority from Japanese Patent Application No. 2020-066613 filed on Apr. 2, 2020, the entire contents of which are hereby incorporated by reference.

BACKGROUND

The disclosure relates to vehicles having center differential devices.

For example, Japanese Unexamined Patent Application Publication (Translation of PCT Application) No. 2018-500233 discloses a technology for monitoring the air pressure of vehicle tires.

SUMMARY

An aspect of the disclosure provides a vehicle including a center differential device and an air pressure controller. The center differential device includes a first output shaft coupled to front wheels and a second output shaft coupled to rear wheels. The center differential device is configured to perform differential operation between the first output shaft and the second output shaft and to limit the differential operation between the first output shaft and the second output shaft. The air pressure controller is configured to control air pressure of one or more tires of the front wheels and the rear wheels such that an average rotational speed of the front wheels and an average rotational speed of the rear wheels are equal to each other.

An aspect of the disclosure provides a vehicle including a center differential device and circuitry. The center differential device has a first output shaft coupled to front wheels and a second output shaft coupled to rear wheels. The center differential device is configured to perform differential operation between the first output shaft and the second output shaft and to limit the differential operation between the first output shaft and the second output shaft. The circuitry is configured to control air pressure of one or more tires of the front wheels and the rear wheels such that an average rotational speed of the front wheels and an average rotational speed of the rear wheels are equal to each other.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

An all-wheel-drive (AWD) vehicle is provided with a center differential device configured to perform differential operation between front wheels and rear wheels. This center differential device is provided with a differential limiting mechanism that suppresses an increase in a rotational speed difference between the front wheels and the rear wheels. The differential limiting mechanism includes, for example, a clutch. When the differential operation is limited by the center differential device, energy output from a driving source is partially used (e.g., lost as frictional heat of the clutch) by the differential limiting mechanism, so that energy to be transmitted to the wheels decreases.

It is desirable to provide a vehicle capable of minimizing the loss of energy to be transmitted to the wheels.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
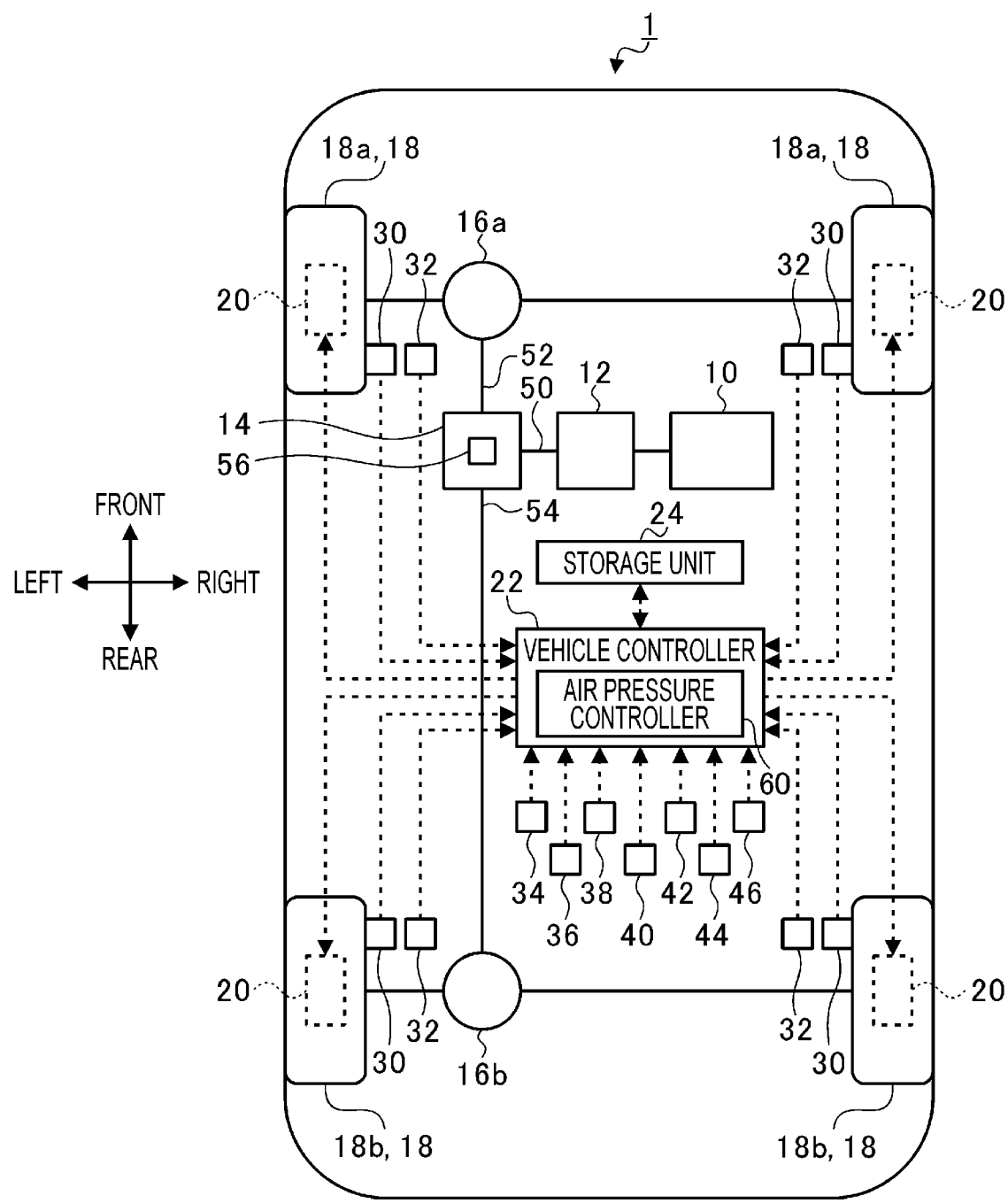
FIG. 1 schematically illustrates the configuration of a vehicle according to an embodiment.

FIG. 1 schematically illustrates the configuration of a vehicle 1 according to this embodiment. The vehicle 1 includes a driving source 10, a transmission 12, a center differential device 14, a front differential device 16a, a rear differential device 16b, front wheels 18a, rear wheels 18b, air pressure adjusters 20, a vehicle controller 22, and a storage unit 24. The vehicle 1 also includes various kinds of sensors, such as wheel speed sensors 30, suspension sensors 32, a shift sensor 34, a steering angle sensor 36, an accelerator pedal sensor 38, a brake pedal sensor 40, a speed sensor 42, an acceleration sensor 44, and a gyro-sensor 46.

The vehicle 1 is an engine automobile provided with an engine as the driving source 10. Alternatively, the vehicle 1 may be an electric automobile provided with a motor as the driving source 10. As another alternative, the vehicle 1 may be a hybrid automobile provided with both an engine and a motor as driving sources 10.

The transmission 12 is, for example, a continuously variable transmission. The primary side of the transmission 12 is coupled to an output shaft of the driving source 10. The secondary side of the transmission 12 is coupled to the center differential device 14.

The center differential device 14 is coupled to an input shaft 50, a first output shaft 52, and a second output shaft 54. The input shaft 50 is coupled to the transmission 12. In other words, the input shaft 50 is coupled to the driving source 10 with the transmission 12 interposed therebetween.

The first output shaft 52 is coupled to the front differential device 16a. The front differential device 16a is coupled to the left and right front wheels 18a. In other words, the first output shaft 52 is coupled to the front wheels 18a with the front differential device 16a interposed therebetween. The second output shaft 54 is coupled to the rear differential device 16b. The rear differential device 16b is coupled to the left and right rear wheels 18b. In other words, the second output shaft 54 is coupled to the rear wheels 18b with the rear differential device 16b interposed therebetween. The front wheels 18*a* and the rear wheels 18*b* may sometimes be collectively referred to as "wheels 18" hereinafter.

The center differential device 14 is capable of outputting torque input to the input shaft 50 to the first output shaft 52 and the second output shaft 54. The center differential device 14 is also capable of performing differential operation between the first output shaft 52 and the second output shaft 54 (i.e., the front wheels 18*a* and the rear wheels 18*b*).

The center differential device 14 also has a differential limiter 56. The differential limiter 56 includes, for example, a clutch capable of engaging between the first output shaft 52 and the second output shaft 54 with a desired engaging force. The differential limiter 56 is capable of limiting the differential operation between the first output shaft 52 and the second output shaft 54 (i.e., the front wheels 18*a* and the rear wheels 18*b*).

The front differential device 16*a* performs differential operation between the left front wheel 18*a* and the right front wheel 18*a*. The rear differential device 16*b* performs differential operation between the left rear wheel 18*b* and the right rear wheel 18*b*. Each of the front differential device 16*a* and the rear differential device 16*b* is a so-called open differential and does not have a differential limiting function.

The air pressure adjusters 20 are provided in the respective wheels 18. Each air pressure adjuster 20 can decrease or increase the air pressure in the tire of the corresponding wheel 18. The air pressure adjuster 20 has, for example, a valve for releasing the air in the tire to the outside to decrease the air pressure in the tire. The air pressure adjuster 20 also has, for example, a pump for pumping air into the tire to increase the air pressure in the tire. A specific configuration of the air pressure adjusters 20 is not limited to the above-described example, and may be any configuration.

The vehicle controller 22 is constituted of a semiconductor integrated circuit that includes a central processing unit (CPU), a read-only memory (ROM) storing a program, and a random access memory (RAM) as a work area. The vehicle controller 22 controls various components, such as a driving mechanism (not illustrated), a braking mechanism (not illustrated), and a steering mechanism (not illustrated), of the vehicle 1. These components will not be described in detail.

The vehicle controller 22 also serves as an air pressure controller 60 by executing a program. The air pressure controller 60 controls the air pressure in the tires of either of the front wheels 18*a* and the rear wheels 18*b* such that an average rotational speed (i.e., average front-wheel rotational speed) of the front wheels 18*a* and an average rotational speed (i.e., average rear-wheel rotational speed) of the rear wheels 18*b* are equal to each other. In other words, the air pressure controller 60 controls the air pressure in the tires of either of the front wheels 18*a* and the rear wheels 18*b* to eliminate a rotational speed difference between the average front-wheel rotational speed and the average rear-wheel rotational speed. The average front-wheel rotational speed indicates a rotational speed obtained by averaging out the rotational speed of the left front wheel 18*a* and the rotational speed of the right front wheel 18*a*. The average rear-wheel rotational speed indicates a rotational speed obtained by averaging out the rotational speed of the left rear wheel 18*b* and the rotational speed of the right rear wheel 18*b*. The air pressure controller 60 will be described in detail later.

The storage unit 24 is a nonvolatile storage unit, such as either one of a flash memory and a hard disk drive, and can retain stored information without being supplied with electric power. The storage unit 24 stores, for example, various kinds of information to be used by the air pressure controller 60.

The wheel speed sensors 30 are provided for the respective wheels 18 and detect the rotational speeds (i.e., wheel speeds) of the wheels 18. The suspension sensors 32 are provided for the respective wheels 18 and detect the amounts of compression of suspensions that support the wheels 18.

The shift sensor 34 detects the position of the shift lever. The steering angle sensor 36 detects the steering angle of the steering wheel. The accelerator pedal sensor 38 detects the accelerator operation amount (i.e., the amount by which the accelerator pedal is pressed). The brake pedal sensor 40 detects the brake operation amount (i.e., the amount by which the brake pedal is pressed).

The speed sensor 42 detects the speed (i.e., vehicle speed) of the vehicle 1. The acceleration sensor 44 detects the acceleration (i.e., acceleration in the front-rear direction, acceleration in the left-right direction, and acceleration in the up-down direction) acting on the vehicle 1. The gyrosensor 46 detects information on the orientation of the vehicle 1, such as the roll angle, the pitch angle, and the yaw angle.

When the rotational speed difference between the average front-wheel rotational speed and the average rear-wheel rotational speed increases, the vehicle controller 22 causes the center differential device 14 to limit the differential operation. When the differential operation is limited, energy output from the driving source 10 is partially used (e.g., lost as frictional heat of the clutch) by the differential limiter 56, so that energy to be transmitted to the wheels 18 decreases.

The air pressure controller 60 of the vehicle 1 according to this embodiment causes the air pressure adjusters 20 to increase or decrease the air pressure in the tires, so as to eliminate the rotational speed difference between the average front-wheel rotational speed and the average rear-wheel rotational speed. In one example, the air pressure controller 60 corrects the air pressure in each tire so that the average front-wheel rotational speed and the average rear-wheel rotational speed accord with each other.

For example, if the rotational speed of any one of the wheels 18 is relatively high, the air pressure controller 60 increases the air pressure in the tire of that wheel 18. When the air pressure increases, the dynamic radius (i.e., dynamic load radius) of the tire becomes larger than that before the increase in the air pressure, thus causing the rotational speed of the wheel 18 to decrease. A dynamic radius indicates an effective radius of a tire corresponding to an actual moving distance of the vehicle 1, and is a value obtained by dividing a moving distance of the vehicle 1 when the wheel 18 makes one rotation by 27C.

Furthermore, for example, when the rotational speed of any one of the wheels 18 is relatively low, the air pressure controller 60 decreases the air pressure in the tire of that wheel 18. When the air pressure decreases, the dynamic radius of the tire becomes smaller than that before the decrease in the air pressure, thus causing the rotational speed of the wheel 18 to increase.

A tire has a standard air pressure set therefor. A standard air pressure indicates the recommended air pressure for the tire under predetermined conditions. Assuming that the air pressure is set to the standard air pressure and the vehicle 1 runs under the predetermined conditions, the wheels 18 are estimated to rotate at a predetermined standard rotational speed.

Between the front wheels 18a and the rear wheels 18b, the air pressure controller 60 changes the air pressure of the wheels 18 with a large divergence from the standard rotational speed corresponding to the standard air pressure so that the air pressure accords with the air pressure of the other wheels 18 (i.e., wheels 18 with a small divergence from the standard rotational speed). For example, the air pressure controller 60 compares an absolute value (i.e., front-wheel divergence value) of a value obtained by subtracting the standard rotational speed from the average front-wheel rotational speed with an absolute value (i.e., rear-wheel divergence value) of a value obtained by subtracting the standard rotational speed from the average rear-wheel rotational speed. If the front-wheel divergence value is larger than the rear-wheel divergence value, the air pressure controller 60 corrects the air pressure of the left and right front wheels 18a. If the rear-wheel divergence value is larger than the front-wheel divergence value, the air pressure controller 60 corrects the air pressure of the left and right rear wheels 18b. For example, the air pressure is increased or decreased evenly for the left and right sides.

By correcting the air pressure of the tires, the rotational speed difference between the average front-wheel rotational speed and the average rear-wheel rotational speed is eliminated, so that the differential limiting operation is performed less frequently, thereby minimizing the loss of energy to be transmitted to the wheels 18.

Figure 2:
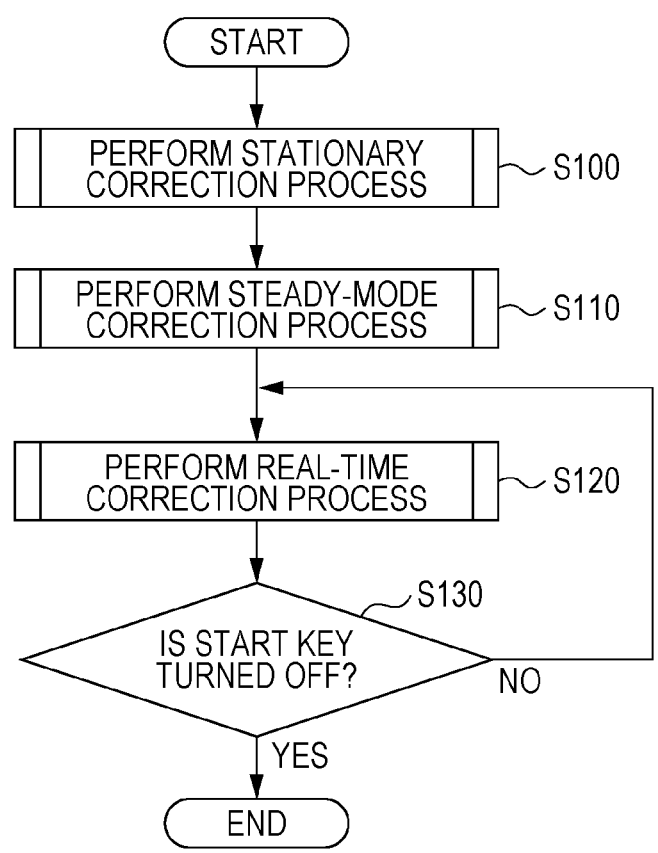
FIG. 2 is a flowchart illustrating the flow of operation of an air pressure controller.

FIG. 2 is a flowchart illustrating the flow of operation of the air pressure controller 60. The air pressure controller 60 performs the series of steps in FIG. 2 for every driving cycle. A driving cycle is a time period from when the start key of the vehicle 1 is turned on to when the start key is turned off.

When the start key is turned on, the air pressure controller 60 first performs a stationary correction process in step S100. A stationary correction process involves correcting the air pressure of the tires when the vehicle 1 is in a stationary state. A stationary state refers to a state where the vehicle 1 is parked (i.e., stopped) on a flat road.

In the stationary correction process, the air pressure controller 60 estimates a dynamic radius (i.e., estimated dynamic radius) of the tires in the stationary state based on a stationary load (i.e., load in the stationary state) acting on either of the front wheels 18a and the rear wheels 18b. The air pressure controller 60 controls the air pressure in the tires of either of the front wheels 18a and the rear wheels 18b such that the estimated dynamic radius of the tires in the stationary state is equal to a preset ideal dynamic radius. An ideal dynamic radius is a recommended dynamic radius in the stationary state, and may be a dynamic radius corresponding to the standard air pressure. The stationary correction process will be described in detail later.

Upon completion of the stationary correction process, the air pressure controller 60 performs a steady-mode correction process in step S110. A steady-mode correction process involves correcting the air pressure of the tires when the vehicle 1 is in a steady mode. A steady mode refers to a mode in which the vehicle 1 is traveling straight on a flat road within a predetermined speed range (e.g., a medium speed range of about 50 to 60 km/h).

In the steady-mode correction process, the air pressure controller 60 controls the air pressure in the tires of either of the front wheels 18a and the rear wheels 18b based on a load acting on either of the front wheels 18a and the rear wheels 18b when the vehicle 1 is traveling in the steady mode. For example, assuming that the vehicle 1 is traveling in the steady mode in a state where there is a difference between an abrasion loss in the tires of the front wheels 18a and an abrasion loss in the tires of the rear wheels 18b, it is estimated that a rotational speed difference may occur between the front wheels 18a and the rear wheels 18b. In the steady-mode correction process, control is performed such that this rotational speed difference caused by such a state of the tires is eliminated. The steady-mode correction process will be described in detail later.

Upon completion of the steady-mode correction process, the air pressure controller 60 performs a real-time correction process in step S120. A real-time correction process involves correcting the air pressure of the tires every time in accordance with a current traveling mode or a driving operation.

In the real-time correction process, the air pressure controller 60 controls the air pressure in the tires of either of the front wheels 18a and the rear wheels 18b in accordance with a gradient of the road on which the vehicle 1 travels.

Furthermore, in the real-time correction process, the air pressure controller 60 controls the air pressure in the tires of either of the front wheels 18a and the rear wheels 18b in accordance with the accelerator operation amount or the brake operation amount.

Moreover, in the real-time correction process, the air pressure controller 60 controls the air pressure in the tires of either of the front wheels 18a and the rear wheels 18b in accordance with the steering angle. In this case, the air pressure controller 60 controls the air pressure such that an average turning radius (i.e., average front-wheel turning radius) of the front wheels 18a and an average turning radius (i.e., average rear-wheel turning radius) of the rear wheels 18b are equal to each other. An average turning radius of the front wheels 18a is a value obtained by averaging out the turning radius of the left front wheel 18a and the turning radius of the right front wheel 18a. An average turning radius of the rear wheels 18b is a value obtained by averaging out the turning radius of the left rear wheel 18b and the turning radius of the right rear wheel 18b. The real-time correction process will be described in detail later.

The air pressure controller 60 repeats the real-time correction process (NO in step S130) until the start key is turned off (i.e., until the driving cycle ends). For example, the air pressure controller 60 may repeat the real-time correction process at about 100 ms. The air pressure controller 60 ends the process when the start key is turned off (YES in step S130).

Figure 3:
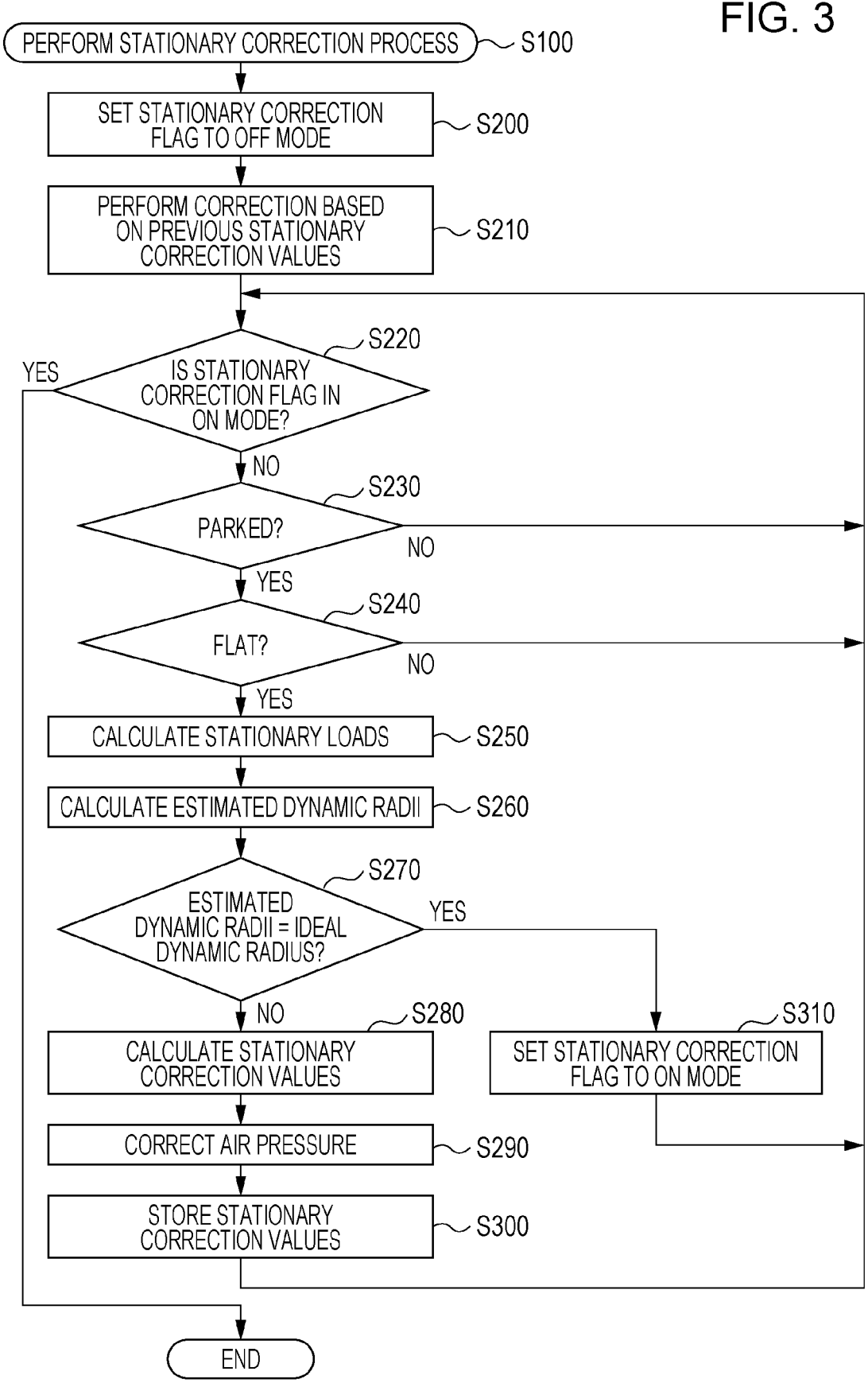
FIG. 3 is a flowchart illustrating the flow of a stationary correction process.

FIG. 3 is a flowchart illustrating the flow of the stationary correction process (step S100). First, the air pressure controller 60 sets a stationary correction flag to an off mode in step S200. A stationary correction flag indicates whether the stationary correction process is completed, and is set to an on mode when the stationary correction process is completed.

The storage unit 24 stores stationary correction values applied in a previous driving cycle. This will be described later. A stationary correction value indicates the air pressure corrected in the stationary correction process and is associated with each wheel 18.

The air pressure controller 60 reads the previous stationary correction values from the storage unit 24 and corrects the air pressure based on the read stationary correction values in step S210. Accordingly, the air pressure in the stationary state in the previous driving cycle is replicated. Therefore, even if the vehicle 1 starts traveling before conditions for determining whether the vehicle 1 is in the stationary state (step S230 and step S240) are satisfied, the air pressure in the stationary state can be corrected at an earlier stage than in a case where step S210 is not to be performed.

Subsequently, the air pressure controller 60 determines in step S220 whether the stationary correction flag is in the on mode. If the stationary correction flag is in the off mode (NO in step S220), the air pressure controller 60 proceeds to step S230 and onward. If step S220 is to be performed for the first time in the current driving cycle, the process proceeds to step S230 and onward since the stationary correction flag is set to the off mode in step S200.

In step S230, the air pressure controller 60 determines whether the vehicle 1 is in a parked state. In detail, the air pressure controller 60 acquires the current shift position from the shift sensor 34, and determines that the vehicle 1 is parked if the acquired shift position is set in the parking range. If the vehicle 1 is not parked (NO in step S230), the air pressure controller 60 returns to step S220.

If the vehicle 1 is parked (YES in step S230), the air pressure controller 60 determines in step S240 whether the road is flat. In detail, the air pressure controller 60 acquires the current acceleration in the front-rear direction and the current acceleration in the left-right direction from the acceleration sensor 44, and determines that the road is flat if the acquired acceleration values are below a predetermined acceleration value. Furthermore, the air pressure controller 60 may acquire the roll angle and the pitch angle from the gyro-sensor 46 and determine that the road is flat if the acquired roll angle and the acquired pitch angle are smaller than a predetermined angle. If the road is not flat (NO in step S240), the air pressure controller 60 returns to step S220.

If the road is flat (YES in step S240), the air pressure controller 60 calculates a stationary load acting on the front wheels 18a and a stationary load acting on the rear wheels 18b in step S250. For example, the air pressure controller 60 acquires the amount of compression of the front suspensions from the suspension sensors 32 for the front wheels 18a, and calculates the stationary load acting on the front wheels 18a based on the amount of compression of the front suspensions. Moreover, the air pressure controller 60 acquires the amount of compression of the rear suspensions from the suspension sensors 32 for the rear wheels 18b, and calculates the stationary load acting on the rear wheels 18b based on the amount of compression of the rear suspensions.

Then, in step S260, the air pressure controller 60 calculates an estimated dynamic radius of the front wheels 18a and an estimated dynamic radius of the rear wheels 18b based on the stationary load acting on the front wheels 18a and the stationary load acting on the rear wheels 18b.

Subsequently, in step S270, the air pressure controller 60 determines whether the estimated dynamic radius of each of the front wheels 18a and the rear wheels 18b is equal to the ideal dynamic radius. If the estimated dynamic radius and the ideal dynamic radius are close to each other within a permissible error range, the air pressure controller 60 may treat the estimated dynamic radius as being equal to the ideal dynamic radius.

If the estimated dynamic radius of either of or each of the front wheels 18a and the rear wheels 18b is different from the ideal dynamic radius (NO in step S270), the air pressure controller 60 calculates each stationary correction value based on a difference between the estimated dynamic radius and the ideal dynamic radius in step S280. For example, the air pressure controller 60 may calculate stationary correction values for the front wheels 18a alone if the estimated dynamic radius of the front wheels 18a alone is different from the ideal dynamic radius, or may calculate stationary correction values for the rear wheels 18b alone if the estimated dynamic radius of the rear wheels 18b alone is different from the ideal dynamic radius. Alternatively, if the estimated dynamic radii of both the front wheels 18a and the rear wheels 18b are different from the ideal dynamic radius, the air pressure controller 60 may calculate stationary correction values for the front wheels 18a and stationary correction values for the rear wheels 18b.

In step S290, the air pressure controller 60 corrects the air pressure based on the calculated stationary correction values. In detail, the air pressure controller 60 causes the air pressure adjusters 20 to pump or release air into or from the tires until the air pressure reaches the stationary correction values.

Then, the air pressure controller 60 causes the storage unit 24 to store the calculated stationary correction values in step S300, and returns to step S220.

In step S270, if the estimated dynamic radii of both the front wheels 18a and the rear wheels 18b are equal to the ideal dynamic radius (YES in step S270), the air pressure controller 60 sets the stationary correction flag to the on mode in step S310, and returns to step S220. Then, in step S220, if the stationary correction flag is in the on mode (YES in step S220), the air pressure controller 60 ends the series of steps with respect to the stationary correction process, and proceeds to the steady-mode correction process.

The air pressure of the tires in the stationary state is corrected in this manner, so that the real-time correction process to be performed later can be performed more accurately.

Figure 4:
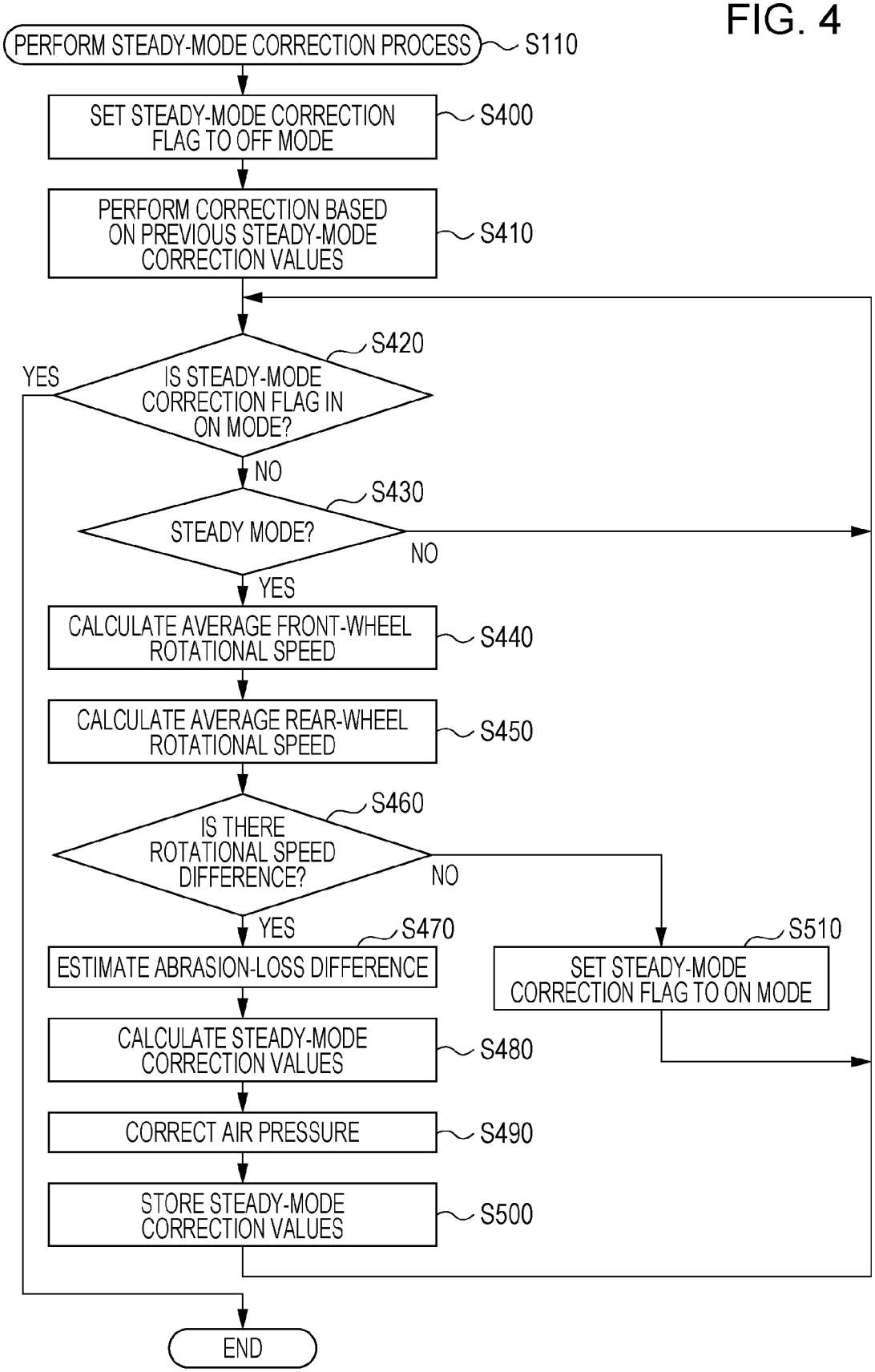
FIG. 4 is a flowchart illustrating the flow of a steady-mode correction process.

FIG. 4 is a flowchart illustrating the flow of the steady-mode correction process (step S110). First, the air pressure controller 60 sets a steady-mode correction flag to an off mode in step S400. A steady-mode correction flag indicates whether the steady-mode correction process is completed, and is set to an on mode when the steady-mode correction process is completed.

The storage unit 24 stores steady-mode correction values applied in a previous driving cycle. This will be described later. A steady-mode correction value indicates the air pressure corrected in the steady-mode correction process and is associated with each wheel 18.

The air pressure controller 60 reads the previous steady-mode correction values from the storage unit 24 and corrects the air pressure based on the read steady-mode correction values in step S410. Accordingly, the air pressure in the steady mode in the previous driving cycle is replicated. Therefore, even if it takes a long period of time to satisfy conditions, to be described later, for determining whether the vehicle 1 is in the steady mode (step S430), the air pressure in the steady mode can be corrected at an earlier stage than in a case where step S410 is not to be performed.

Subsequently, the air pressure controller 60 determines in step S420 whether the steady-mode correction flag is in the on mode. If the steady-mode correction flag is in the off mode (NO in step S420), the air pressure controller 60 proceeds to step S430 and onward. If step S420 is to be performed for the first time in the current driving cycle, the process proceeds to step S430 and onward since the steady-mode correction flag is set to the off mode in step S400.

In step S430, the air pressure controller 60 determines whether the vehicle 1 is traveling in the steady mode. In detail, the air pressure controller 60 determines whether the road is flat by using, for example, the acceleration from the acceleration sensor 44. Furthermore, the air pressure controller 60 acquires the current speed of the vehicle 1 from the speed sensor 42 and determines whether the acquired speed is within a predetermined speed range. Moreover, the air pressure controller 60 acquires the current steering angle from the steering angle sensor 36 and determines whether an absolute value of the acquired steering angle is smaller than a predetermined steering angle indicating straight-ahead driving. If the road is flat, the speed is within the predetermined speed range, and the absolute value of the steering angle is smaller than the predetermined steering angle, the air pressure controller 60 determines that the vehicle 1 is traveling in the steady mode.

If the vehicle 1 is traveling in the steady mode (YES in step S430), the air pressure controller 60 calculates an average front-wheel rotational speed in step S440. In detail, the air pressure controller 60 acquires wheel speeds from the wheel speed sensor 30 for the left front wheel 18a and the wheel speed sensor 30 for the right front wheel 18a. The air pressure controller 60 calculates the average front-wheel rotational speed by averaging out a rotational speed based on the wheel speed of the left front wheel 18a and a rotational speed based on the wheel speed of the right front wheel 18a.

Then, the air pressure controller 60 calculates an average rear-wheel rotational speed in step S450. In detail, the air pressure controller 60 acquires wheel speeds from the wheel speed sensor 30 for the left rear wheel 18b and the wheel speed sensor 30 for the right rear wheel 18b. The air pressure controller 60 calculates the average rear-wheel rotational speed by averaging out a rotational speed based on the wheel speed of the left rear wheel 18b and a rotational speed based on the wheel speed of the right rear wheel 18b.

Subsequently, the air pressure controller 60 determines in step S460 whether there is a rotational speed difference between the average front-wheel rotational speed and the average rear-wheel rotational speed. If the average front-wheel rotational speed and the average rear-wheel rotational speed are close to each other within a permissible error range, the air pressure controller 60 may treat that there is no rotational speed difference between the average front-wheel rotational speed and the average rear-wheel rotational speed.

If there is a rotational speed difference between the average front-wheel rotational speed and the average rear-wheel rotational speed (YES in step S460), the air pressure controller 60 estimates a tire abrasion-loss difference in in step S470. A tire abrasion-loss difference indicates a difference between an average front-wheel abrasion loss obtained by averaging out abrasion losses of the left and right tires of the front wheels 18a and an average rear-wheel abrasion loss obtained by averaging out abrasion losses of the left and right tires of the rear wheels 18b.

For example, a map (i.e., abrasion-loss-difference map) in which the rotational speed difference between the average front-wheel rotational speed and the average rear-wheel rotational speed and the tire abrasion-loss difference are associated with each other is preliminarily stored in the air pressure controller 60. The air pressure controller 60 uses this abrasion-loss-difference map to estimate the tire abrasion-loss difference.

Subsequently, the air pressure controller 60 calculates steady-mode correction values based on the tire abrasion-loss difference in step S480. For example, a map (i.e., steady-mode correction map) in which the tire abrasion-loss difference and steady-mode correction values are associated with each other is preliminarily stored in the storage unit 24. The air pressure controller 60 uses this steady-mode correction map to calculate the steady-mode correction values.

Subsequently, the air pressure controller 60 corrects the air pressure based on the calculated steady-mode correction values in step S490. In detail, the air pressure controller 60 causes the air pressure adjusters 20 to pump or release air into or from the tires until the air pressure reaches the steady-mode correction values.

Then, the air pressure controller 60 causes the storage unit 24 to store the calculated steady-mode correction values in step S500, and returns to step S420.

In step S460, if the average front-wheel rotational speed and the average rear-wheel rotational speed are equal to each other (NO in step S460), the air pressure controller 60 sets the steady-mode correction flag to the on mode in step S510, and returns to step S420. Then, in step S420, if the steady-mode correction flag is in the on mode (YES in step S420), the air pressure controller 60 ends the series of steps with respect to the steady-mode correction process, and proceeds to the real-time correction process.

The air pressure of the tires in the steady mode is corrected in this manner, so that the subsequent real-time correction process can be performed more accurately.

The steady-mode correction process may include additional steps, including a step for correcting the air pressure in the tires of the front wheels 18a so as to match the rotational speeds of the left and right front wheels 18a and a step for correcting the air pressure in the tires of the rear wheels 18b so as to match the rotational speeds of the left and right rear wheels 18b.

Figure 5:
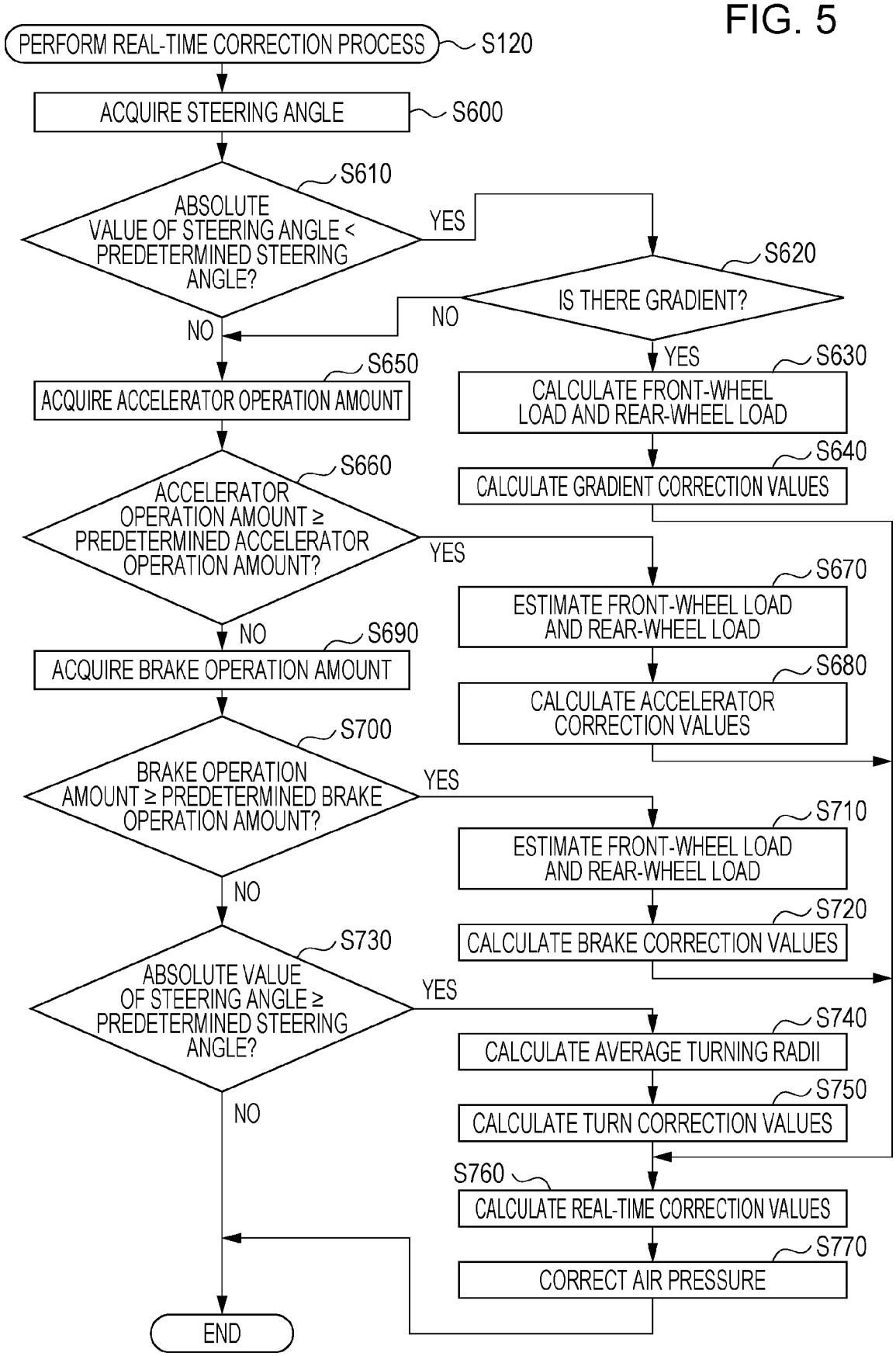
FIG. 5 is a flowchart illustrating the flow of a real-time correction process.

FIG. 5 is a flowchart illustrating the flow of the real-time correction process (step S120). First, the air pressure controller 60 acquires the current steering angle from the steering angle sensor 36 in step S600. Then, the air pressure controller 60 determines in step S610 whether an absolute value of the acquired steering angle is smaller than a predetermined steering angle.

If the absolute value of the steering angle is smaller than the predetermined steering angle (YES in step S610), the air pressure controller 60 determines in step S620 whether the road on which the vehicle 1 is currently traveling has a gradient. For example, the air pressure controller 60 determines that the road has a gradient if the pitch angle from the gyro-sensor 46 is larger than or equal to a predetermined pitch angle.

If the road has a gradient (YES in step S620), the air pressure controller 60 calculates a load (i.e., front-wheel load) currently acting on the front wheels 18a and a load (i.e., rear-wheel load) currently acting on the rear wheels 18b in step S630. For example, the air pressure controller 60 calculates the front-wheel load based on the amount of compression obtained by the suspension sensors 32 for the front wheels 18a, and calculates the rear-wheel load based on the amount of compression obtained by the suspension sensors 32 for the rear wheels 18b. Alternatively, the air pressure controller 60 may calculate the front-wheel load and the rear-wheel load based on the acceleration in the front-rear direction detected by the acceleration sensor 44.

Subsequently, the air pressure controller 60 calculates gradient correction values based on the calculated front-wheel load and the calculated rear-wheel load in step S640, and proceeds to step S760 to be described later. A gradient correction value indicates the air pressure corrected in the real-time correction process related to the gradient of a road, and is associated with each wheel 18.

For example, when the vehicle 1 is to travel on an uphill road, the rear-wheel load normally becomes larger than the front-wheel load. This causes the dynamic radius of the tires of the rear wheels 18b to become smaller than the dynamic radius of the tires of the front wheels 18a, and the average rear-wheel rotational speed to become higher than the average front-wheel rotational speed.

The air pressure controller 60 calculates the average front-wheel rotational speed from the front-wheel load, and calculates the average rear-wheel rotational speed from the rear-wheel load. The air pressure controller 60 calculates a rotational speed difference between the average front-wheel rotational speed and the average rear-wheel rotational speed. Moreover, a rotational-speed-difference map in which the rotational speed difference and the air pressure are associated with each other is preliminarily stored in the storage unit 24. The air pressure controller 60 refers to the rotational-speed-difference map to calculate the gradient correction values.

When the air pressure is corrected based on the gradient correction values calculated in this manner, the rotational speed difference between the average front-wheel rotational speed and the average rear-wheel rotational speed can be reduced even if the vehicle 1 is traveling on a road having a gradient, thereby minimizing the loss of energy to be transmitted to the wheels 18.

If the absolute value of the current steering angle is larger than or equal to the predetermined steering angle (NO in step S610) or if the current road has no gradient (NO in step S620), the air pressure controller 60 acquires the current accelerator operation amount from the accelerator pedal sensor 38 in step S650. Then, the air pressure controller 60 determines in step S660 whether the acquired accelerator operation amount is larger than or equal to a predetermined accelerator operation amount. In other words, it is determined whether an acceleration command is input.

When the vehicle 1 accelerates, the front-wheel load normally decreases and the rear-wheel load normally increases, as compared with the state before the acceleration. If the accelerator operation amount is larger than or equal to the predetermined accelerator operation amount (YES in step S660), the air pressure controller 60 estimates a front-wheel load and a rear-wheel load that have been changed due to the acceleration based on the accelerator operation amount in step S670.

A map (i.e., accelerator correction map) in which the accelerator operation amount, the road gradient, and the loads (i.e., front-wheel load and rear-wheel load) acting on the wheels 18 are associated with one another is preliminarily stored in the storage unit 24. The air pressure controller 60 refers to this accelerator correction map to estimate the front-wheel load and the rear-wheel load. Since the front-wheel load and the rear-wheel load vary between a case where the vehicle 1 accelerates on an uphill road and a case where the vehicle 1 accelerates on a downhill road, the associated items in the accelerator correction map also include the gradient.

Subsequently, the air pressure controller 60 calculates accelerator correction values based on the estimated front-wheel load and the estimated rear-wheel load in step S680, and proceeds to step S760 to be described later. An accelerator correction value indicates the air pressure corrected in the real-time correction process related to an accelerating operation, and is associated with each wheel 18.

For example, the air pressure controller 60 estimates an average front-wheel rotational speed during acceleration based on the estimated front-wheel load, and estimates an average rear-wheel rotational speed during acceleration based on the estimated rear-wheel load. The air pressure controller 60 calculates a rotational speed difference between the average front-wheel rotational speed and the average rear-wheel rotational speed. The air pressure controller 60 refers to the rotational-speed-difference map to calculate the accelerator correction values.

When the air pressure is corrected based on the accelerator correction values calculated in this manner, the rotational speed difference (i.e., rotational speed difference between the front and rear wheels) between the average front-wheel rotational speed and the average rear-wheel rotational speed can be reduced even if the vehicle 1 is accelerating in accordance with an accelerator operation, thereby minimizing the loss of energy to be transmitted to the wheels 18.

Furthermore, pumping or releasing air into or from the tires is time consuming to some extent. Moreover, a slight time lag occurs from when the accelerator pedal is operated to when the vehicle 1 actually starts accelerating. In the vehicle 1, the air pressure is corrected in accordance with the accelerator operation amount, so that even if the air pumping or releasing process is time consuming, the air pressure of the tires can be adjusted in response to the actual acceleration, as compared with a case where the air pressure is corrected in accordance with an acceleration detection result. As a result, the loss of energy to be transmitted to the wheels 18 can be minimized more accurately.

If the accelerator operation amount is smaller than the predetermined accelerator operation amount (NO in step S660), the air pressure controller 60 acquires the current brake operation amount from the brake pedal sensor 40 in step S690. Then, the air pressure controller 60 determines in step S700 whether the acquired brake operation amount is larger than or equal to a predetermined brake operation amount. In other words, it is determined whether a deceleration command is input.

When the vehicle 1 decelerates, the rear-wheel load normally decreases and the front-wheel load normally increases, as compared with the state before the deceleration. If the brake operation amount is larger than or equal to the predetermined brake operation amount (YES in step S700), the air pressure controller 60 estimates a front-wheel load and a rear-wheel load that have been changed due to the deceleration based on the brake operation amount in step S710.

For example, a map (i.e., brake correction map) in which the brake operation amount, the road gradient, and the loads (i.e., front-wheel load and rear-wheel load) acting on the wheels 18 are associated with one another is preliminarily stored in the storage unit 24. The air pressure controller 60 refers to this brake correction map to estimate the front-wheel load and the rear-wheel load. Since the front-wheel load and the rear-wheel load vary between a case where the vehicle 1 decelerates on an uphill road and a case where the vehicle 1 decelerates on a downhill road, the associated items in the brake correction map also include the gradient.

Subsequently, the air pressure controller 60 calculates brake correction values based on the estimated front-wheel load and the estimated rear-wheel load in step S720, and proceeds to step S760 to be described later. A brake correction value indicates the air pressure corrected in the real-time correction process related to a decelerating operation, and is associated with each wheel 18.

For example, the air pressure controller 60 estimates an average front-wheel rotational speed during deceleration based on the estimated front-wheel load, and estimates an average rear-wheel rotational speed during deceleration based on the estimated rear-wheel load. The air pressure controller 60 calculates a rotational speed difference between the average front-wheel rotational speed and the average rear-wheel rotational speed. The air pressure controller 60 refers to the rotational-speed-difference map to calculate the brake correction values.

When the air pressure is corrected based on the brake correction values calculated in this manner, the rotational speed difference between the front and rear wheels can be reduced even if the vehicle 1 is decelerating in accordance with a braking operation, thereby minimizing the loss of energy to be transmitted to the wheels 18.

In the vehicle 1, the air pressure is corrected in accordance with the brake operation amount, so that even if the air pumping or releasing process is time consuming, the air pressure of the tires can be adjusted in response to the actual deceleration, as compared with a case where the air pressure is corrected in accordance with a deceleration detection result. As a result, the loss of energy to be transmitted to the wheels 18 can be minimized more accurately.

If the brake operation amount is smaller than the predetermined brake operation amount (NO in step S700), the air pressure controller 60 determines in step S730 whether the absolute value of the current steering angle is larger than or equal to a predetermined steering angle. In other words, it is determined whether a turning operation is performed. The predetermined steering angle in step S730 may be the same as or different from the predetermined steering angle in step S610.

When the vehicle 1 makes a turn, the average turning radius of the front wheels 18a normally becomes larger than the average turning radius of the rear wheels 18b. As a result, the average front-wheel rotational speed becomes higher than the average rear-wheel rotational speed. If the absolute value of the current steering angle is larger than or equal to the predetermined steering angle (YES in step S730), the air pressure controller 60 calculates an average turning radius of the front wheels 18a and an average turning radius of the rear wheels 18b based on the steering angle in step S740.

Subsequently, the air pressure controller 60 calculates turn correction values based on the calculated average turning radius of the front wheels 18a and the calculated average turning radius of the rear wheels 18b in step S750, and proceeds to step S760 to be described later. A turn correction value indicates the air pressure corrected in the real-time correction process related to a turning operation, and is associated with each wheel 18.

For example, the air pressure controller 60 calculates a turning radius difference between the average turning radius of the front wheels 18a and the average turning radius of the rear wheels 18b. Furthermore, a map (i.e., turning radius map) in which the turning radius difference and the air pressure are associated with each other is preliminarily stored in the storage unit 24. The air pressure controller 60 refers to this turning radius map to calculate the turn correction values.

When the air pressure is corrected based on the turn correction values calculated in this manner, the rotational speed difference between the front and rear wheels can be reduced even if the vehicle 1 is making a turn in accordance with a turning operation, thereby minimizing the loss of energy to be transmitted to the wheels 18.

A slight time lag occurs from when a turning operation is performed to when the vehicle 1 actually starts to make a turn. In the vehicle 1, the air pressure is corrected in accordance with the steering angle, so that even if the air pumping or releasing process is time consuming, the air pressure of the tires can be adjusted in response to the actual turning process, as compared with a case where the air pressure is corrected in accordance with either one of an acceleration detection result and a load detection result. As a result, the loss of energy to be transmitted to the wheels 18 can be minimized more accurately.

In step S760, the air pressure controller 60 calculates real-time correction values based on the gradient correction values, the accelerator correction values, the brake correction values, and the turn correction values. A real-time correction value indicates the air pressure to be actually corrected in the real-time correction process at the current time point, and is associated with each wheel 18. A real-time correction value is a comprehensive value of a gradient correction value, an accelerator correction value, a brake correction value, and a turn correction value. For example, a real-time correction value may be an average value of a gradient correction value, an accelerator correction value, a brake correction value, and a turn correction value that are calculated at the current control timing of the real-time correction process. If a single one of the gradient correction value, the accelerator correction value, the brake correction value, and the turn correction value is calculated at the current control timing, the calculated correction value may be used as a real-time correction value.

Subsequently, the air pressure controller 60 corrects the air pressure based on the calculated real-time correction values in step S770, and ends the real-time correction process at the current control timing. In detail, the air pressure controller 60 causes the air pressure adjusters 20 to pump or release air into or from the tires until the air pressure reaches the real-time correction values.

When the air pressure is corrected based on the comprehensive real-time correction values of the gradient correction values, the accelerator correction values, the brake correction values, and the turn correction values, the rotational speed difference between the front and rear wheels can be reduced even if the vehicle 1 is traveling in a more complicated state, thereby further minimizing the loss of energy to be transmitted to the wheels 18.

In step S730, if the absolute value of the current steering angle is smaller than the predetermined steering angle (NO in step S730), the air pressure controller 60 ends the real-time correction process at the current control timing. In this case, the air pressure is not corrected at the current control timing of the real-time correction process, and the air pressure at the previous control timing is maintained.

Accordingly, in the vehicle 1 according to this embodiment, the air pressure in the tires of either of the front wheels 18a and the rear wheels 18b is controlled such that the average front-wheel rotational speed and the average rear-wheel rotational speed accord with each other (i.e., the rotational speed difference between the average front-wheel rotational speed and the average rear-wheel rotational speed is eliminated).

Therefore, in the vehicle 1 according to this embodiment, the loss of energy to be transmitted to the wheels 18 can be minimized. As a result, the vehicle 1 according to this embodiment can achieve improved fuel efficiency.

Although the embodiment of the disclosure has been described above with reference to the appended drawings, the disclosure is not limited to the above embodiment. It is apparent to a person skilled in the art that various modifications and alterations are conceivable within the scope defined in the claims, and it is to be understood that such modifications and alterations naturally belong to the technical scope of the disclosure.

For example, in the above embodiment, the real-time correction process commences after the stationary correction process and the steady-mode correction process are performed. Alternatively, the air pressure controller 60 may omit either one or both of the stationary correction process and the steady-mode correction process and commence the real-time correction process.

Furthermore, in the above embodiment, the stationary correction process, the steady-mode correction process, and the real-time correction process are performed for every driving cycle. Alternatively, either one or both of the stationary correction process and the steady-mode correction process may be performed once every plurality of driving cycles.

The vehicle controller 22 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle controller 22 including the air pressure controller 60. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the vehicle controller 22 including the air pressure controller 60 illustrated in FIG. 1.

The invention claimed is:

1. A vehicle comprising:
a center differential device comprising a first output shaft coupled to front wheels and a second output shaft coupled to rear wheels, the center differential device being configured to perform differential operation between the first output shaft and the second output shaft and to limit the differential operation between the first output shaft and the second output shaft; and
an air pressure controller configured to control air pressure of one or more tires of the front wheels and the rear wheels such that an average rotational speed of the front wheels and an average rotational speed of the rear wheels are equal to each other,
wherein the air pressure controller is configured to:
estimate an estimated dynamic radius of one or more tires on a basis of one or more loads acting on one or more wheels including the one or more tires in a stationary state of the one or more wheels; and
control the air pressure of the one or more tires such that the estimated dynamic radius is equal to a preset ideal dynamic radius.

2. The vehicle according to claim 1, wherein the air pressure controller is configured to control the air pressure of the one or more tires on a basis of one or more loads acting on one or more wheels including the one or more tires when the vehicle is traveling in a steady mode.

3. The vehicle according to claim 2, wherein the air pressure controller is configured to control the air pressure of the one or more tires in accordance with a gradient of a road on which the vehicle travels.

4. The vehicle according to claim 3, wherein the air pressure controller is configured to control the air pressure of the one or more tires in accordance with at least one of an accelerator operation amount and/or a brake operation amount.

5. The vehicle according to claim 2, wherein the air pressure controller is configured to control the air pressure of the one or more tires in accordance with at least one of an accelerator operation amount and/or a brake operation amount.

6. The vehicle according to claim 1, wherein the air pressure controller is configured to control the air pressure of the one or more tires in accordance with a gradient of a road on which the vehicle travels.

7. The vehicle according to claim 6, wherein the air pressure controller is configured to control the air pressure of the one or more tires in accordance with at least one of an accelerator operation amount and/or a brake operation amount.

8. The vehicle according to claim 1, wherein the air pressure controller is configured to control the air pressure of the one or more tires in accordance with at least one of an accelerator operation amount and/or a brake operation amount.

9. A vehicle comprising:
a center differential device comprising a first output shaft coupled to front wheels and a second output shaft coupled to rear wheels, the center differential device being configured to perform differential operation between the first output shaft and the second output shaft and to limit the differential operation between the first output shaft and the second output shaft; and
circuitry configured to control air pressure of one or more tires of the front wheels and the rear wheels such that an average rotational speed of the front wheels and an average rotational speed of the rear wheels are equal to each other,
wherein the circuitry is configured to control the air pressure of the one or more tires on a basis of one or more loads acting on one or more wheels including the one or more tires when the vehicle is traveling in a steady mode.

10. The vehicle according to claim 9, wherein the circuitry is configured to control the air pressure of the one or more tires in accordance with at least one of i) a gradient of a road on which the vehicle travels, ii) an accelerator operation amount or iii) a brake operation amount.

11. A vehicle comprising:
a center differential device comprising a first output shaft coupled to front wheels and a second output shaft coupled to rear wheels, the center differential device being configured to perform differential operation between the first output shaft and the second output shaft and to limit the differential operation between the first output shaft and the second output shaft; and
an air pressure controller configured to control air pressure of one or more tires of front wheels and the rear wheels such that an average rotational speed of the front wheels and an average rotational speed of the rear wheels are equal to each other,
wherein the air pressure controller is configured to control the air pressure of the one or more tires in accordance with i) a gradient of a road on which the vehicle travels, ii) an accelerator operation amount or iii) a brake operation amount.

* * * * *